(12) United States Patent
Yelvington (10) Patent No.: US 10,197,135 B2
(45) Date of Patent: Feb. 5, 2019

(54) REVERSE PULLEY ATTACHMENT FOR RUBBER CUSHIONED REAR WHEELS OF MOTORCYCLES

(71) Applicant: Yelvington Trikes, LLC, Seminole, FL (US)

(72) Inventor: Richard Yelvington, Seminole, FL (US)

(*) Notice: Subject to any disclaimer, the term of this patent is extended or adjusted under 35 U.S.C. 154(b) by 308 days.

(21) Appl. No.: 15/292,182

(22) Filed: Oct. 13, 2016

(65) Prior Publication Data

US 2017/0030437 A1    Feb. 2, 2017

Related U.S. Application Data

(63) Continuation-in-part of application No. 14/513,964, filed on Oct. 14, 2014, now Pat. No. 9,739,365.

(51) Int. Cl.

| | |
|---|---|
| *B63H 23/08* | (2006.01) |
| *F16H 9/24* | (2006.01) |
| *F16H 61/30* | (2006.01) |
| *B62M 9/06* | (2006.01) |
| *B62M 11/16* | (2006.01) |
| *B62K 11/04* | (2006.01) |
| *B62L 1/00* | (2006.01) |
| *F16H 63/30* | (2006.01) |
| *F16H 3/60* | (2006.01) |

(52) U.S. Cl.
CPC .............. *F16H 9/24* (2013.01); *B62K 11/04* (2013.01); *B62L 1/005* (2013.01); *B62M 9/06* (2013.01); *B62M 11/16* (2013.01); *B63H 23/08* (2013.01); *F16H 61/30* (2013.01); *F16H 3/60* (2013.01); *F16H 63/302* (2013.01)

(58) Field of Classification Search
None
See application file for complete search history.

(56) References Cited

U.S. PATENT DOCUMENTS

| | | | | |
|---|---|---|---|---|
| 7,311,636 | B1* | 12/2007 | Regula | B62M 7/02 |
| | | | | 475/326 |
| 2006/0226631 | A1* | 10/2006 | Holroyd | B62K 25/02 |
| | | | | 280/285 |
| 2007/0287574 | A1* | 12/2007 | Chen | B62M 11/16 |
| | | | | 475/318 |
| 2008/0196960 | A1* | 8/2008 | Brown | B62K 11/04 |
| | | | | 180/227 |
| 2013/0340551 | A1* | 12/2013 | Grandi | B62M 11/06 |
| | | | | 74/404 |

\* cited by examiner

*Primary Examiner* — Justin Holmes
(74) *Attorney, Agent, or Firm* — Larson & Larson, P.A.; Justin P. Miller; Frank Liebenow (57) ABSTRACT

A motorcycle wheel attachment or replacement of the existing drive pulley used on the rear rubber cushioned wheel of motorcycles and trikes. The attachment or replacement contains an apparatus that allows the operator of the motorcycle or trike to ride the motorcycle or trike in forward or reverse drive using a control linkage or electrical switch.

5 Claims, 9 Drawing Sheets

REVERSE PULLEY ATTACHMENT FOR RUBBER CUSHIONED REAR WHEELS OF MOTORCYCLES

STATEMENT OF RELATED APPLICATIONS

This patent application is based on and claims the benefit of U.S. Utility patent application Ser. No. 14/513,964 having a filing date of Oct. 14, 2014.

BACKGROUND OF THE INVENTION

The invention pertains to the replacement or attachment of existing Harley-Davidson and other rubber cushioned drive sprockets or pulleys with a replacement or attachment that allows the motorcycle or trike to drive in forward and reverse.

Description of the Prior Art

Most motorcycles are very heavy and can weigh as much as 1,300 pounds. A rider trying to balance the weight of the motorcycle and passenger finds it very difficult to balance the motorcycle while pushing it with his or her feet to back up. There exists prior art mechanisms that allow a motorcycle to back up. However, in general, the prior art does not take into account the rubber cushioning in most modern motorcycle rear wheels. The pulley casing suffers from problems of heat expansion from heat generated by the drive belt running on the pulley. The subject invention solves this problem with the use of flexible bearings and gears.

SUMMARY OF THE INVENTION

In general, the invention replaces the rubber mounted or cushioned forward-only pulleys on Harley-Davidson brand motorcycles or other rubber cushioned pulleys with an attachment containing a forward-reverse drive apparatus and selector mechanism. The selector mechanism can be contained in a replacement axle for the existing rear wheel axle.

In general, the invention contains a motorcycle or trike attachment or replacement apparatus including an outer hub to accept a drive belt, a flexible gear planetary to allow for heat expansion, a spline engage-disengage operated by a pneumatic or electrical piston inside a hollow axle, all of which allow the rider to select forward or reverse motion.

In one embodiment, the outer drive hub is always driving in forward and transferring power thru the rubber cushion in the rear wheel hub to the rear wheel and tire.

In another embodiment the spline engage-disengage is actuated by the rider and engages the electric actuator or pneumatic piston to select forward and reverse.

In another aspect, when selected by the rider, the spline engage-disengage locks up the center drive or drum which holds the flexible rollers which act as planetary gears to allow the rear of the hub housing to turn in reverse. This transfers power through the rubber cushion on the rear wheel hub to the rear wheel and tire.

In another aspect, the invention transfers the high torque required to drive the motorcycle or trike up a steep hill or trailer ramp in reverse for loading. The high torque is spread out over both sides of the motorcycle or trike axle by torque plates which tie the axle to the motorcycle swing arm or trike suspension frame.

Another advantage of the invention is the adjustability of the torque plates that transfer torque from the reverse effort to the swing arm of the motorcycle or trike suspension. These torque plates have the ability to travel with the hollow axle inside the motorcycle swing arm axle capture slots which allows the motorcycle or trike drive belt to be loosened or tightened for ease of installation, maintenance, and tire changes.

In yet another embodiment, the forward-reverse engage-disengage is powered by pneumatic or electric piston and a pump-compressor controlled by the rider from the controls mounted in reach of the rider.

Another aspect of the invention is the adjustable pressure set screws located on the torque plates. These set screws apply pressure to the rear of the swing arm casting where the replacement axle is located. These set screws prevent the axle opening from being over torqued and distorted or bent under heavy duty or steep backups of the motorcycle or trike.

DETAILED DESCRIPTION OF THE INVENTION

The device offers significant improvements over previous bolt-on forward-reverse gear pulleys by allowing the use of a non-bolt on forward-reverse rubber cushioned pulley to replace or attach to the existing forward only pulley. These rubber cushioned pulleys are held in place by an axle going through the rear wheel of the motorcycle or trike differential, and a hollow housing inside the rear wheel or trike differential.

Figure 1A:
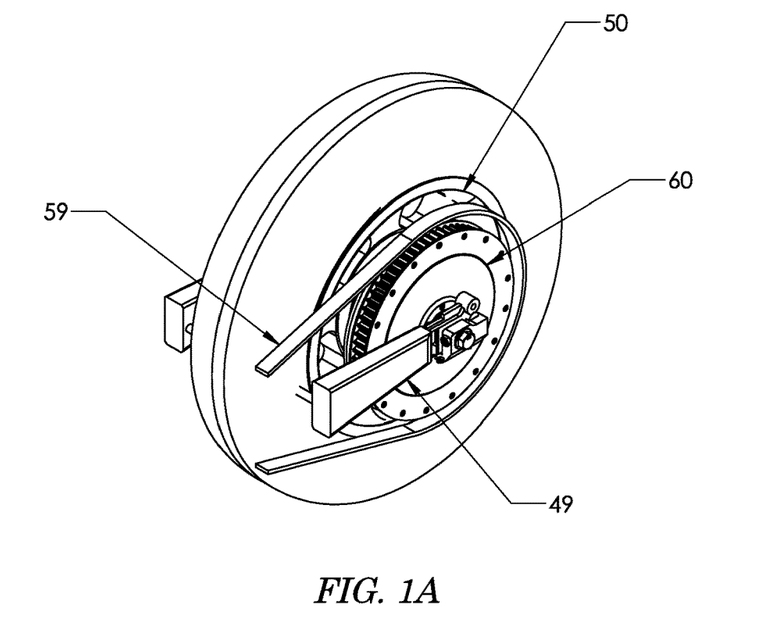
FIG. 1A is a left-side view of a rubber-cushioned style rear motorcycle tire and wheel showing the reverse pulley attachment applied thereto with the drive belt loosened.
Figure 1B:
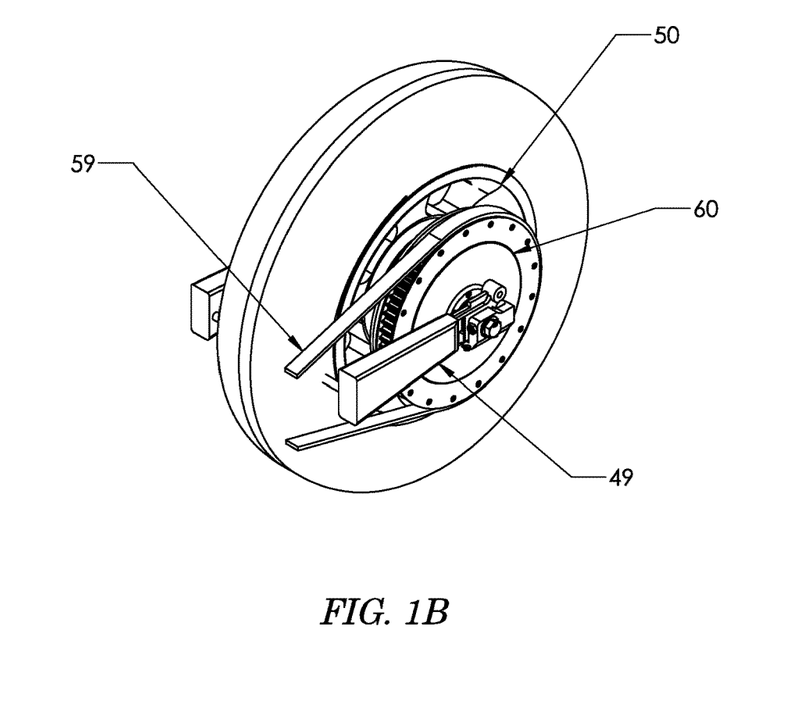
FIG. 1B is a left-side view of a rubber-cushioned style rear motorcycle tire and wheel showing the reverse pulley attachment applied thereto with the drive belt tightened.

The key component of one embodiment is the support method by which the ends of the axle are supported to the swingarm of the motorcycle by the use of adjustable torque plates. The adjustable torque plates allow the drive belt 59 to be loosened (FIG. 1A) for pulley installation and tightening so the drive belt 59 is the correct tension between the front engine drive pulley and the reverse pulley assembly 60 (FIG. 1B).

Figure 4:
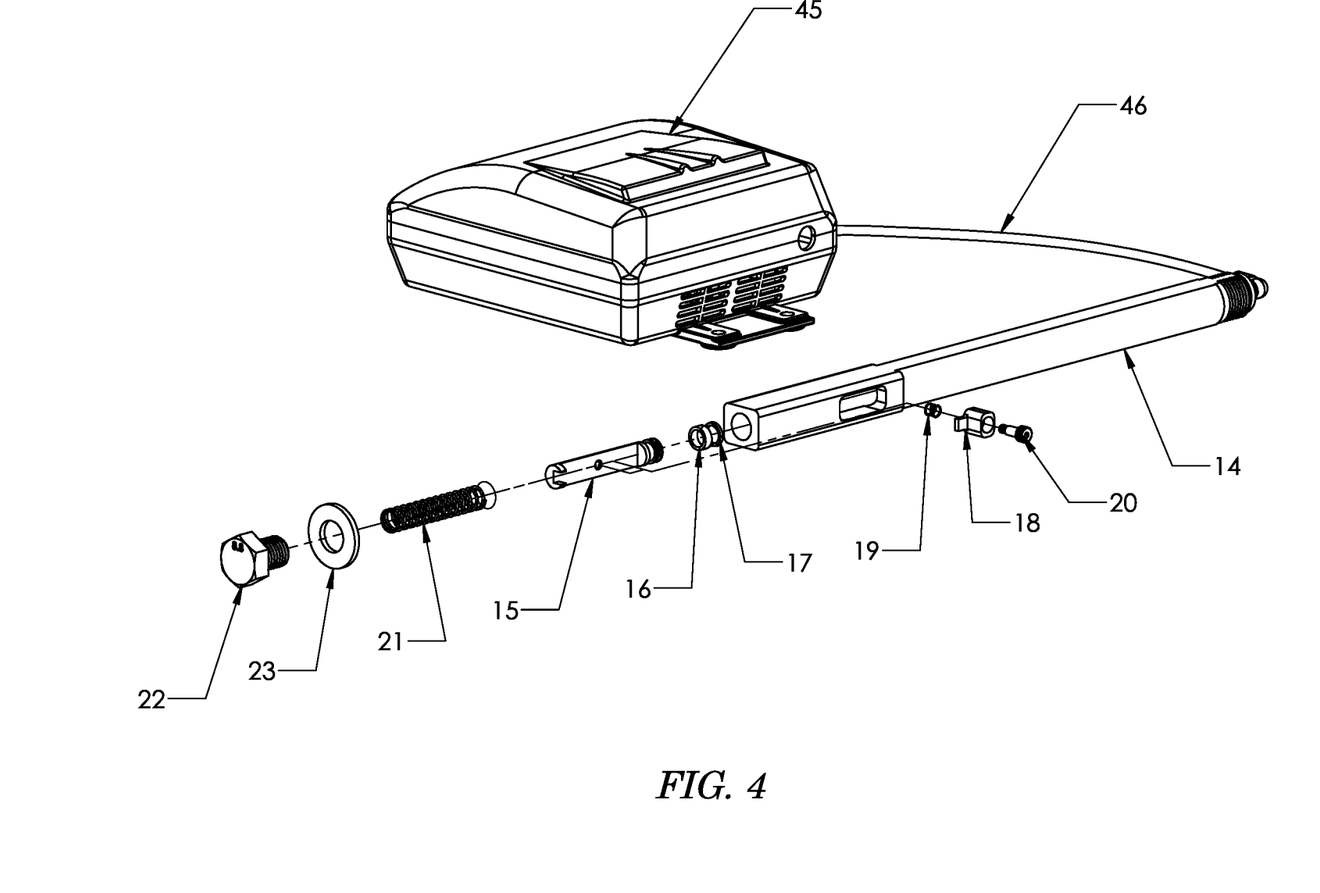
FIG. 4 is an exploded view of the embodiment showing the axle-air shift assembly and air compressor.

Now referring to FIG. 4, another key component of the embodiment is the sliding spline design that allows the device to change from forward to reverse. Said design consists of a spline collar 28, and a reverse spline collar 29. Because the outer pulley 7 is rubber mounted to the motorcycle wheel instead of bolted on, the axle acts as the main support. The axle now acts as the support for the spline collar 28 and allows for a precise method of engagement and disengagement.

The present design is an improvement over prior art forward-reverse pulleys in that it reduces the problems of heat expansion of the metal occurring during operation. The internal drums and gears expand at different rates which in prior art devices have the potential to cause the internal drums to be forced into each other, jamming the device and bearing. The improved design described and claimed herein uses flexible urethane rollers that act as planetary gears to allow the device to run in either forward or reverse; even if the internal drums expand under heat. The flexible rollers can be compressed during heat expansion and still run without jamming.

By using the compressible flexible rollers, no lubrication, oil, or grease is needed in the drive roller system. This is also an improvement over prior art as the improved device does not require oil or grease seals.

Another key improvement of this reverse pulley attachment over prior art is the use of proprietary material plastic bearing and dowels that separate the moving surfaces from each other. These plastic bearings and dowels also allow for heat expansion to take place with no jamming of components turning against each other. The plastic bearings and dowels are self-lubricating by virtue of the plastic containing polycyclides which allows the device to run without the use of grease, oil, or seals.

Power to push the internal piston inside the hollow axle comes from an externally mounted air compressor and valve system taking their power from the battery of the motorcycle or trike. The compressor is activated by a control switch or toggle located in easy reach by the rider of the motorcycle or trike.

Another significant improvement of this reverse pulley attachment is the use of flexible planetary rollers acting as the connection between the drive and driven outside and inside drum. The flexibility of the rollers acts as an additional cushioning effect along with the rubber cushion inside the rear wheel. This reduces the impact on the other internal components inside the forward-reverse pulley during hard driving and hard gear shifting.

Figure 2:
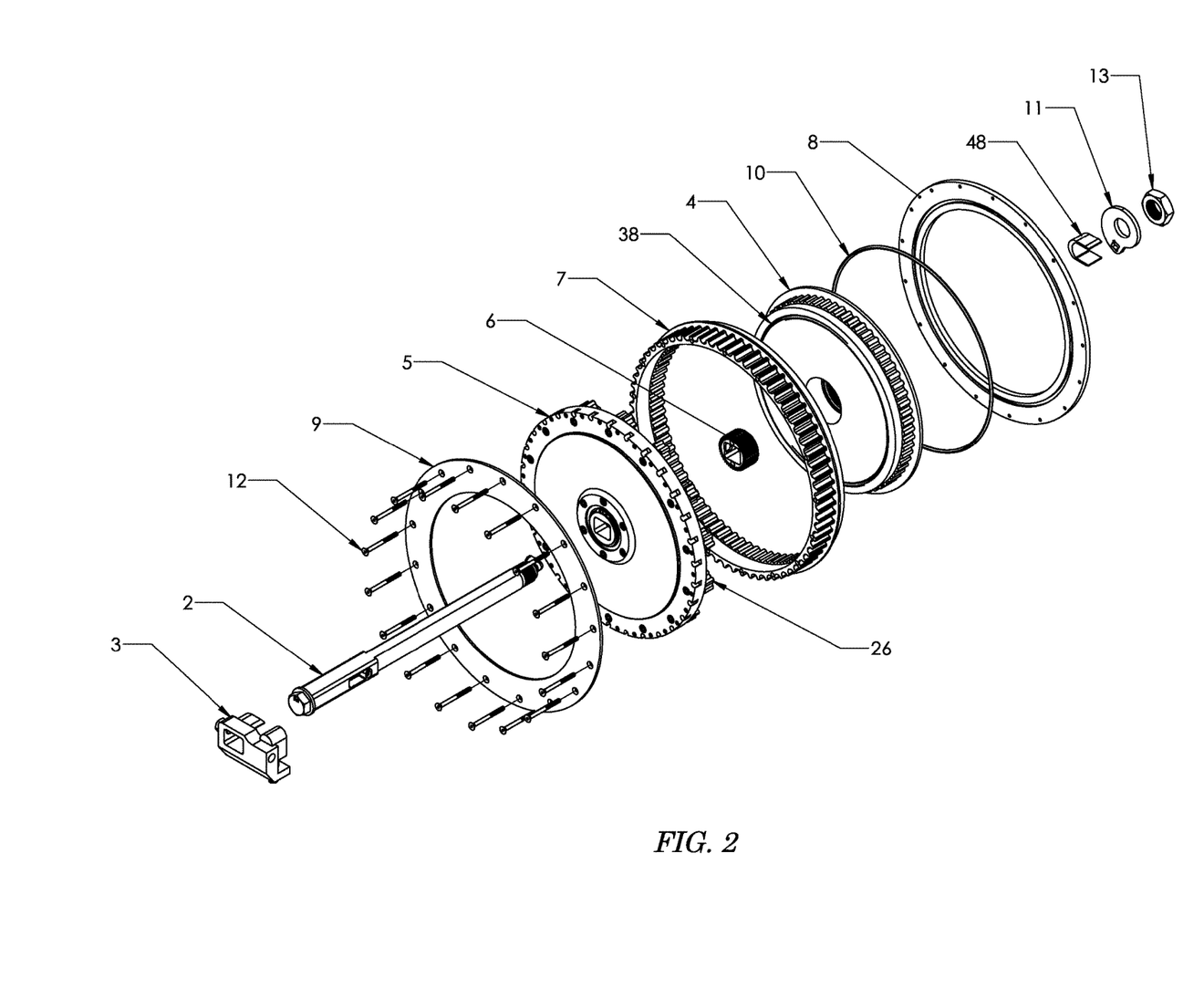
FIG. 2 is an exploded view of the embodiment of the present invention.

Referring now to FIG. 2, this is an exploded view from the front left side of one embodiment of the invention. More specifically, the rubber-cushioned rear-wheel reverse assembly 1 is shown disassembled with the torque restraint assembly 3 fitting over the axle assembly 2. The device's front housing plate 9 is held to the outer pulley 7 by final assembly screws 12.

The locking plate assembly 5 is held between the front housing plate 9 and the outer pulley 7. The shift slider assembly 6 centers up on the axle assembly 2 to achieve alignment with the center of the locking plate assembly 5.

A plastic O-ring 38 prevents the center hub assembly 4 from coming into metal to metal contact with the locking plate assembly 5 Likewise, the spacer O-ring 10 prevents metal to metal contact with the back housing plate 8 and the center hub assembly 4.

The right side of the axle assembly 2 runs down the center of all of the components in FIG. 1 and through the torque plate right 48 and the axle adjuster 11. The existing axle nut 13 is threaded onto the right side of the axle assembly 2 and when the existing axle nut 13 is tightened, the components that make up FIG. 1 act as a drive-pulley.

Figure 3:
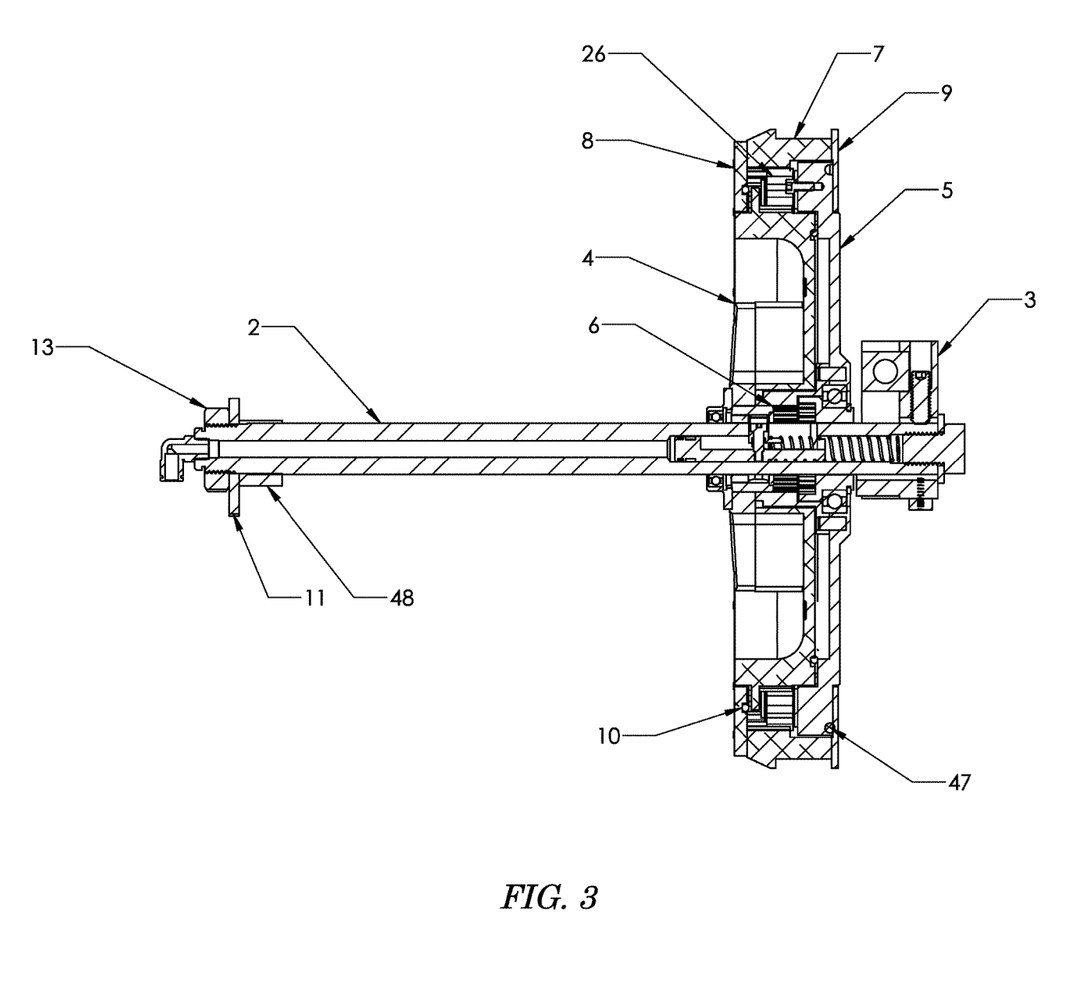
FIG. 3 is a sectional view of the embodiment of FIG. 2.

Referring now to FIG. 3, which is a cross-section view of an assembled rubber-cushioned rear-wheel reverse assembly 1, the axle assembly 2 acts as a centering device for all of the main components. The torque restraint assembly 3 supports the left side of the axle assembly 2. The front housing plate 9 uses screws to secure the locking plate assembly 5 to the outer pulley 7. Flexible ball bearing 47 and spacer O-ring 10 prevent metal to metal contact of the locking plate assembly 5, the front housing plate 9 and the center hub assembly 4. They also prevent metal to metal contact with the back housing plate 8 and the center huh assembly 4. The flexible ball bearing 47 and spacer O-ring 10 are made of a durable plastic that can resist deformation during operation of the vehicle. The axle assembly 2 acts as a center and guide for the shift slider assembly 6 to move along The torque plate right 48 is on one side of the axle adjuster 11 and is secured by the existing axle nut 13.

Referring to FIG. 4, this is an exploded view of the axle assembly 2 with accompanying compressor 45. The air compressor 45 supplies air to the hollow axle 14. The compressed air pushes against the piston wear band 16 and the piston cup seal 17 captured in grooves on the piston 15. The piston 15 is moved by the compressed air and pushes the piston return spring 21 at the same time it moves the actuator 18 which is held to the piston 15 by the pin 19 secured by the shoulder screw 20. The washer 23 is captured by the axle retaining bolt 22 which acts as an air seal and a push stop for the piston return spring 21.

One of key component of the invention is a hollow axle 14 that contains the piston 15, the piston wear band 16, the piston cup seal 17, the actuator 18, the pin 19, the shoulder screw 20, the piston return spring 21, the axle retaining bolt 22, and the washer 23. This allows the device to change from forward or reverse using an actuator 18 pushing through the top of the hollow axle 14 and engaging a spline collar 28 inside the outer pulley 7. This actuator 18 is connected to a piston 15 inside the hollow axle 14. The piston 15 is moved back and forth by air from a self-contained air compressor 45. The hollow axle 14 is flat on the front and back which allows for increased belt adjustment versus if the hollow axle 14 were completely round.

Figure 5:
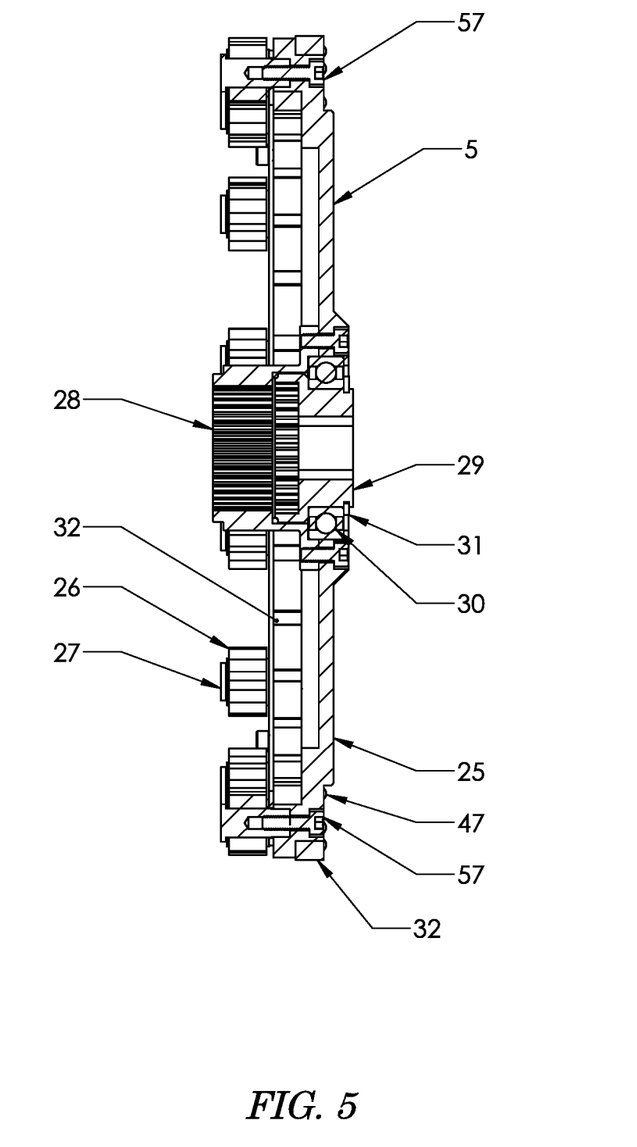
FIG. 5 is a sectional view of the embodiment showing the locking plate assembly.

Referring to FIG. 5, this is a cross-section view of the locking plate assembly containing the flexible ball bearing 47 and the flexible roller bearing 32. The flexible roller gears 26 are held to the locking plate assembly 5 by roller axles 27 and hex bolts 57. The spline collar 28 slides into the reverse spline collar 29. The spline collar 28 is also supported by the spline support bearing 30 which is held in place by the bearing retainer clip 31.

Figure 6:
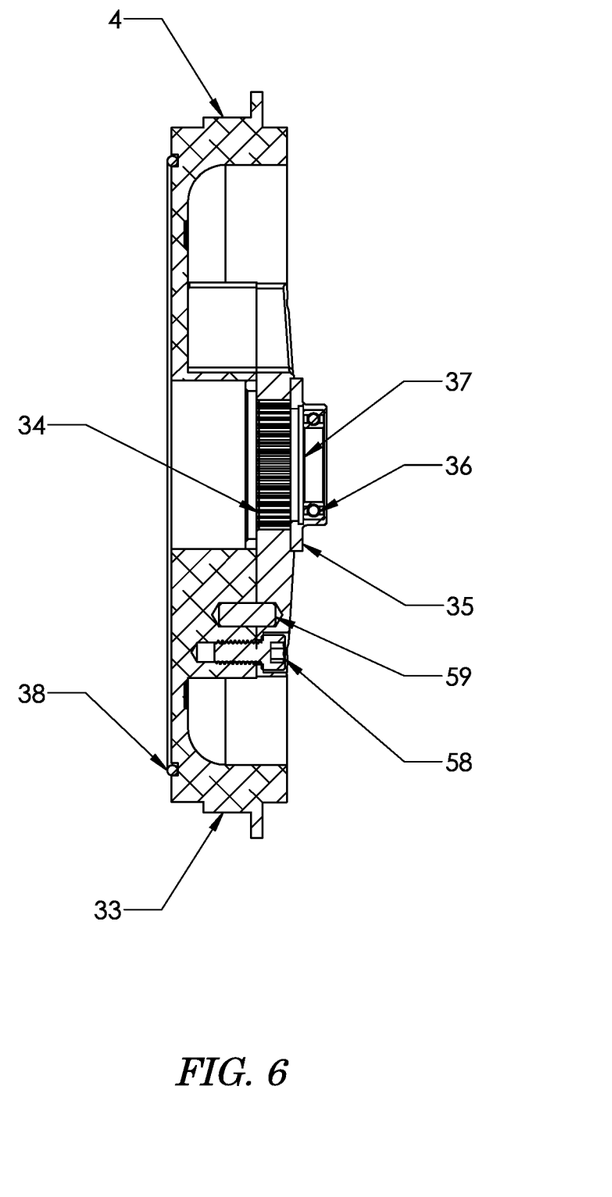
FIG. 6 is a sectional view of the embodiment showing the center hub assembly.

Referring to FIG. 6, this is a cross-section view of the center hub assembly 4 containing the plastic O-ring 38. The forward spline collar 34 is secured to the center hub 33 by hex bolts 57 and steel dowel pins 58. The forward spline collar 34 is supported on an axle bearing 36 which is held in place by a retaining clip 37.

Figure 7:
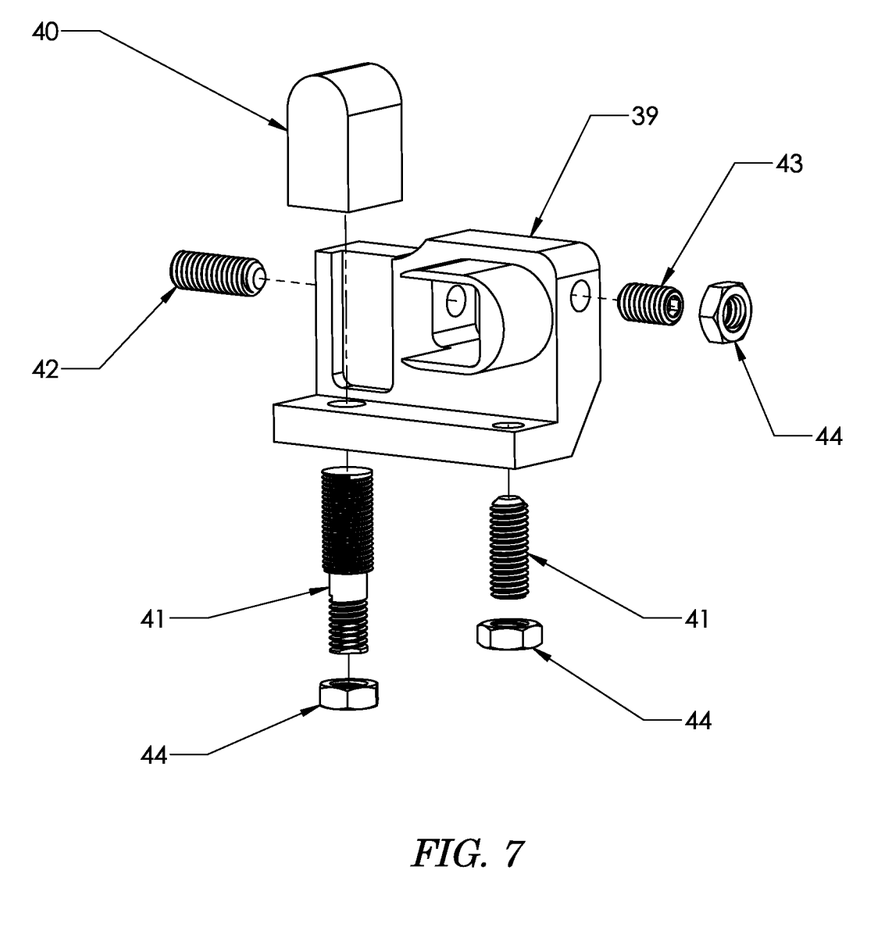
FIG. 7 is an exploded view of the embodiment showing the torque restraint assembly.

Referring to FIG. 7, this is an exploded, front view of the torque restraint assembly 3 which mounts onto the original mounting points of the rubber-cushioned rear-wheel reverse. The torque restraint 39 is on the left side of the rubber-cushioned rear-wheel reverse assembly 1. The torque restraint 39 uses the set screw-long 42 and set screw-short 43 to adjust the axle assembly 2 for tightening and loosening the rubber-cushioned rear-wheel reverse assembly. The jam nut 44 prevents the set screw-short 43 from loosening. There is an adjust block 40 which is held to the torque restraint 39 by adjust screws 41 and jam nuts 44. These screws help stabilize the torque restraint 39 and reduce load on the motorcycle swingarm 50 (see FIG. 7).

Figure 8:
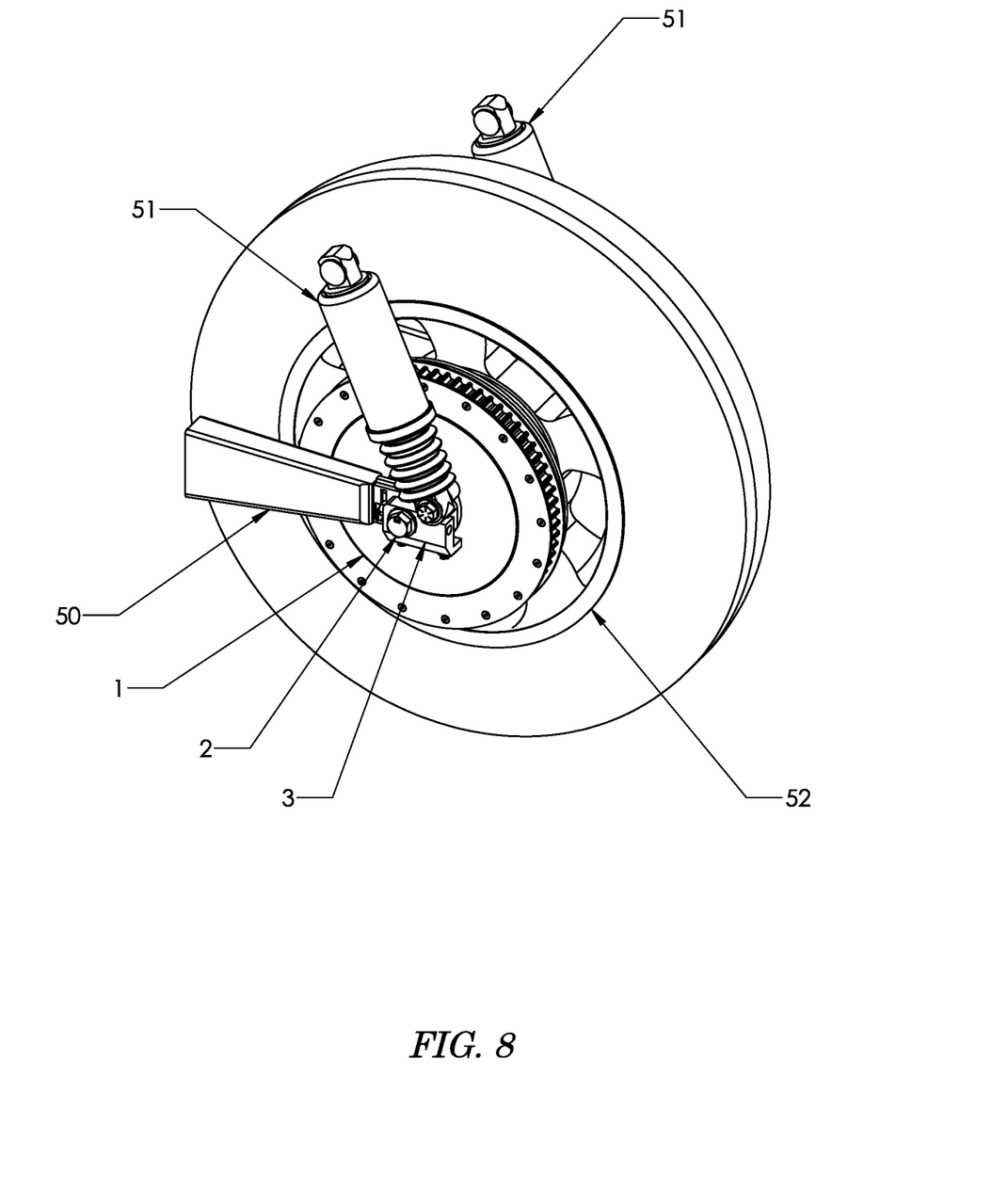
FIG. 8 is left-side view of the rear motorcycle tire and wheel.

Referring to FIG. 8, this is a left side view of the stock rear wheel assembly 52 of a. motorcycle mounted on the stock swing arm 50 and showing stock shock absorber 51. Mounted on the stock rear wheel 49 is the rubber-cushioned rear-wheel reverse assembly 1 held in place by the e restraint assembly 3 and the axle assembly 2.

Figure 9A:
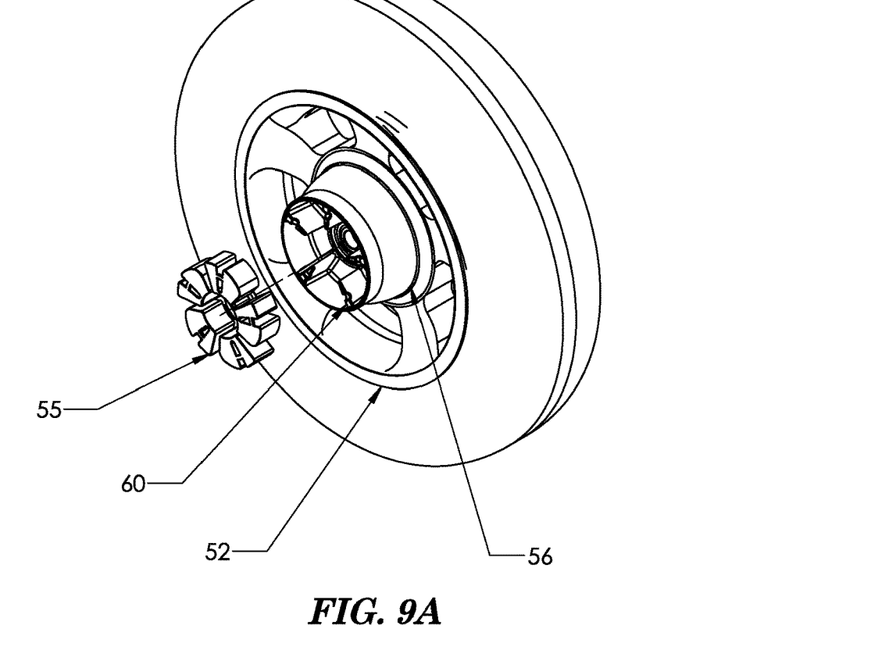
FIG. 9A is a left-side view of a rubber-cushioned style rear motorcycle tire and wheel.

Referring to FIG. 9A, this is a standard rubber-cushioned wheel which has a rubber cushioned rear-wheel rubber insert 55 located inside a stock rear wheel 49 with rubber-cushioned rear-wheel wheel hub 56 used to accept the rubber-cushioned rear-wheel rubber insert 55.

Figure 9B:
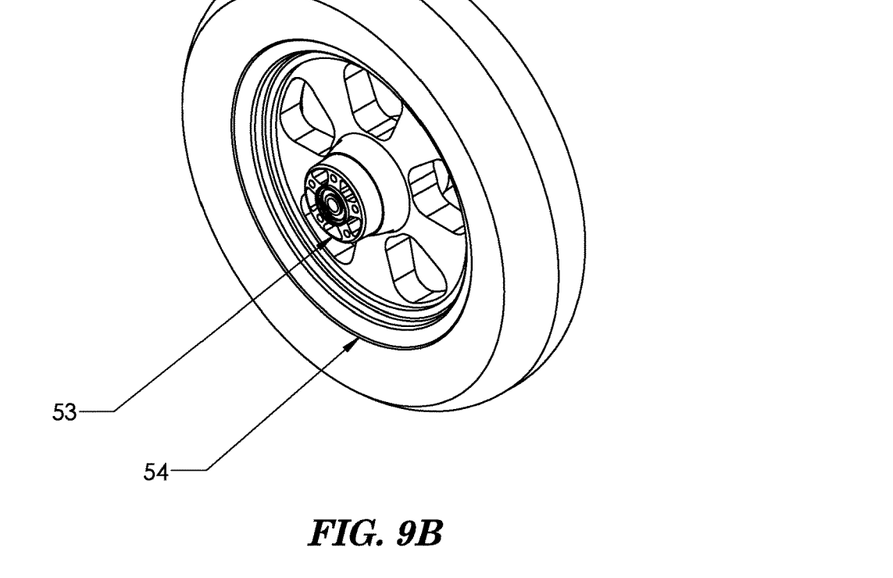
FIG. 9B is a left-side view of a bolt-on style rear motorcycle tire and wheel.

Referring to FIG. 9B this is a standard bolt-on wheel 54 which is non rubber-cushioned and has a wheel hub 53 for attaching the drive pulleys of standard motorcycles.

LIST OF REFERENCE NUMERALS

1. Rubber-Cushioned Rear-Wheel Reverse Assembly
2. Axle Assembly
3. Torque Restraint Assembly
4. Center Hub Assembly
5. Locking Plate Assembly
6. Shift Slider Assembly
7. Outer Pulley
8. Back Housing Plate
9. Front Housing Plate
10. Spacer O-Ring
11. Axle Adjuster
12. Final Assembly Screws
13. Existing Axle Nut
14. Hollow Axle
15. Piston
16. Piston Wear Band
17. Piston Cup Seal
18. Actuator
19. Pin
20. Shoulder Screw
21. Piston Return Spring
22. Axle Retaining Bolt
23. Washer
24. Air Inlet Elbow
25. Locking Plate
26. Flexible Roller Gear
27. Roller Axle
28. Spline Collar
29. Reverse Spline Collar
30. Spline Support Bearing
31. Bearing Retaining Clip
32. Flexible Roller Bearing
33. Center Hub
34. Forward Spline Collar
35. Bearing Retainer
36. Axle Bearing
37. Retaining Clip
38. Plastic O-Ring
39. Torque Restraint
40. Adjust Block
41. Adjust Screw
42. Set Screw-Long
43. Set Screw-Short
44. Jam Nut
45. Air Compressor
46. Air Line
47. Flexible Ball Bearings
48. Torque Plate—Right
49. Stock Rear Wheel
50. Stock Swing Arm
51. Stock Shock Absorber
52. Stock Rear Wheel Assembly
53. Flat-Bolt Hub
54. Bolt On Rear Wheel
55. Rubber-Cushioned Rear-Wheel Rubber Insert
56. Rubber-Cushioned Rear-Wheel Wheel Hub
57. Hex Bolts
58. Steel Dowels
59. Drive Belt
60. Reverse Pulley Assembly

The invention claimed is:

1. A motorcycle pulley for replacement or attachment to the existing rubber cushioned forward drive only rear pulley or sprocket, comprising:
   a motorcycle forward-reverse wheel pulley that can be mounted on a hollow axle comprising round, middle, and square or flattened ends,
   a hollow axle containing a push-pull mechanism and a control pin that allows the control pin to shift the device from forward to reverse from inside the hollow axle,
   a left torque plate and a right torque plate that act as supports on the hollow axle and a motorcycle swing-arm, and
   the left and right torque plates containing adjustment set screws to allow a motorcycle drive belt to be tightened and loosened as the adjustment set screws are adjusted.

2. The forward-reverse motorcycle wheel pulley in claim 1, additionally comprising:
   an actuator piston assembly contained in the hollow axle,
   an actuator pin fitted to the actuator piston that actuates through an opening in the hollow axle,
   wherein, when the motorcycle forward-reverse wheel pulley is installed on a pulley belt, the hollow axle can be slid into the pulley in such a manner that the actuator pin engages a forward-reverse selector.

3. The forward-reverse motorcycle wheel pulley in claim 1, additionally comprising:
   an pressurized air source comprising an electrically driven air compressor as an air source,
   a mechanically operated selector comprised of a pull cable and a handle,
   an electrically operated selector comprised of an electric linear actuator,
   wherein when a rider switches from forward to reverse, an air source containing a compressor, supplies air to an internal axle piston to move the internal axle piston into the reverse position.

4. The forward-reverse motorcycle pulley in claim 1, additionally comprising:
   a mechanical compressor driven off of a brake disc as a source of compressed air,
   the mechanical compressor comprising a valve air storage control and a pneumatic control if an electrically driven compressor is not used.

5. The forward-reverse motorcycle pulley in claim 1, additionally comprising:
   an electrical lockout to prevent the forward-reverse pulley from engaging in reverse during forward operation.

* * * * *